United States Patent
Chakravarthy et al.

(10) Patent No.: US 8,601,106 B2
(45) Date of Patent: Dec. 3, 2013

(54) REMOTE COMMAND EXECUTION OVER A NETWORK

(75) Inventors: Gundabattula Ananth K. Chakravarthy, Pune (IN); Supal J. Patel, Pun (IN); Bhavuk Srivastava, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/619,883

(22) Filed: Nov. 17, 2009

(65) Prior Publication Data
US 2011/0119336 A1    May 19, 2011

(51) Int. Cl.
*G06F 15/173*    (2006.01)

(52) U.S. Cl.
USPC ........... 709/223; 709/225; 709/228; 709/232; 726/4; 726/27; 455/420

(58) Field of Classification Search
USPC ......... 709/206, 219, 223, 225, 227–228, 229, 709/232; 715/752; 713/152, 170; 726/4, 27; 455/420
See application file for complete search history.

(56) References Cited

U.S. PATENT DOCUMENTS

| | | | |
|---|---|---|---|
| 5,764,639 A | 6/1998 | Staples et al. | |
| 6,301,484 B1 | 10/2001 | Rogers et al. | |
| 7,325,035 B1 * | 1/2008 | Arnold | 709/206 |
| 7,542,460 B2 | 6/2009 | Kuwabara et al. | |
| 7,546,345 B2 * | 6/2009 | Burbridge et al. | 709/205 |
| 7,634,263 B2 * | 12/2009 | Louch et al. | 455/420 |
| 2004/0266418 A1 * | 12/2004 | Kotzin | 455/420 |
| 2007/0124406 A1 | 5/2007 | Liu et al. | |
| 2008/0144603 A1 * | 6/2008 | Chouksey et al. | 370/352 |
| 2008/0178273 A1 | 7/2008 | Weber | |
| 2009/0220064 A1 * | 9/2009 | Gorti et al. | 379/202.01 |
| 2009/0225750 A1 * | 9/2009 | Hawkins | 370/353 |
| 2009/0247183 A1 * | 10/2009 | Fahrenthold | 455/456.1 |
| 2010/0115420 A1 * | 5/2010 | De Gibon et al. | 715/751 |
| 2011/0041159 A1 * | 2/2011 | Tripathi et al. | 726/3 |

FOREIGN PATENT DOCUMENTS

| | | |
|---|---|---|
| EP | 1193961 A2 | 4/2002 |
| EP | 1465397 A1 | 10/2004 |
| EP | 1313300 B1 | 12/2007 |
| WO | 0246971 A1 | 6/2002 |
| WO | 2006125579 A1 | 11/2006 |

* cited by examiner

*Primary Examiner* — Oanh Duong
(74) *Attorney, Agent, or Firm* — Patents on Demand P.A.; Brian K. Buchheit; Scott M. Garrett

(57) ABSTRACT

Embodiments of the present invention include methods, systems and computer program products. In one embodiment, a method described herein includes receiving, at a host terminal having a unique identifier, a message including at least an authentication field, an operation field, an entity field and an argument field; and authenticating a remote user in response to the authentication field. The first method can also include identifying an entity selected by the remote user in response to the entity field; identifying an argument selected by the remote user in response to the argument field; and performing an operation selected by the remote user in response to the operation field. Performance of the operation allows the remote user to perform and/or control tasks, communications and/or processes on the host terminal.

19 Claims, 4 Drawing Sheets

REMOTE COMMAND EXECUTION OVER A NETWORK

BACKGROUND

The disclosure relates to the field of communications, computing systems, and interactive voice response systems. More particularly, the disclosure relates to a device, system, apparatus, method, and/or computer program product permitting remote command execution over a network.

Interactive Voice Response systems are commonly used to take the users input and perform a task if required. These systems are typically not configurable by the user at the user level, and more such systems lack the capability to execute any actions on their own. They are typically only used to fetch information from a database. They are applications only existing in the phone infrastructure but not the user's environment.

SUMMARY

The present invention relates generally to distributed computing and more specifically to methods, systems and computer program products configured for remotely commanding execution of predetermined tasks over a communication system. One embodiment of the present invention includes a first method, including receiving, at a host terminal having a unique identifier, a message including at least an authentication field, an operation field, an entity field and an argument field; and authenticating a remote user in response to the authentication field. The first method can also include identifying an entity selected by the remote user in response to the entity field; identifying an argument selected by the remote user in response to the argument field; and performing an operation selected by the remote user in response to the operation field.

A second embodiment of the present invention includes a first computer program product including a computer readable storage medium having computer readable program code embodied therewith, the computer readable program code including computer readable program code to receive a message including at least an authentication field, an operation field, an entity field and an argument field; and computer readable program code to authenticate a remote user in response to the authentication field. The computer readable program code of the first computer program product can also include computer readable program code to identify an entity selected by the remote user in response to the entity field; computer readable program code to identify an argument selected by the remote user in response to the argument field; and computer readable program code to perform an operation selected by the remote user in response to the operation field.

A third embodiment of the present invention includes a second method including configuring a remote terminal at a user terminal, the configuration including establishing an identifier field and a phone function; and configuring an operation field including at least one or more predetermined operations. The second method can further include configuring an entity field including at least one or more predetermined entities; and setting the user terminal to receive messages from the remote terminal.

It should be noted that various embodiments of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

Other embodiments and features of the present invention are described in detail with reference to the following drawings.

DETAILED DESCRIPTION

Figure 1:
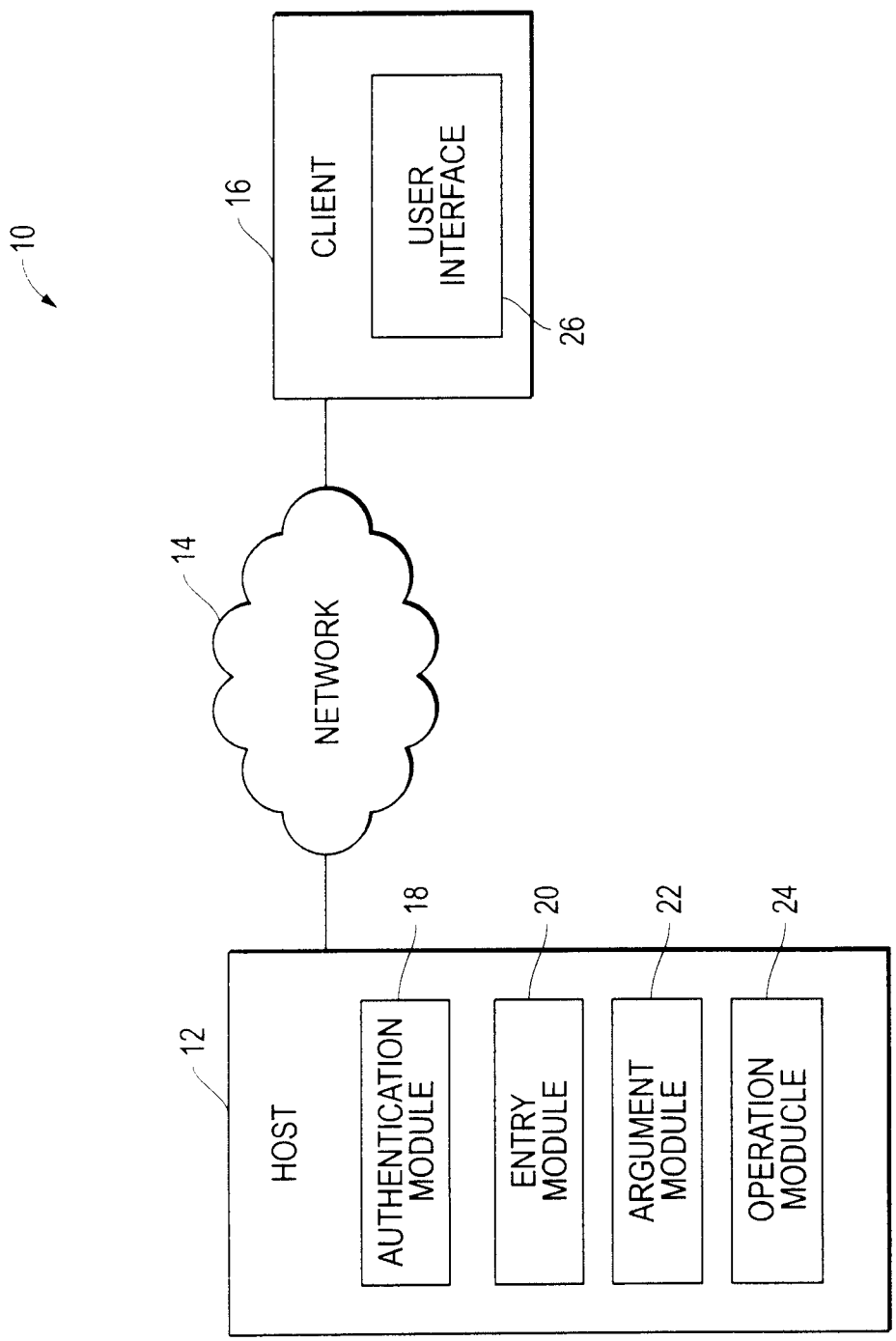
FIG. 1 is a schematic block diagram of a suitable operating environment for the embodiments of the present invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.), or an embodiment combining software and hardware embodiments that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated date signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for embodiments of the present invention may be written in any combination of one or more programming languages, including an object oriented programming language such as Java, Smalltalk, C++ or the like or conventional procedural programming languages, such as the "C" programming language or similar programming languages. The programming code may execute entirely on the user's computer, partly on the user's computer, as a stand-alone software package, partly on the user's computer and partly on a remote computer or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a special purpose computer such as a server, or a smart phone, soft phone, personal digital assistant or any other machine adapted for executing programmable instructions in accordance with the description thereof set forth above.

As shown in FIG. 1, an example system 10 or operating environment of the various embodiments of the present invention includes a host terminal 12 such as a computer that is operatively connected or connectable to a client 16 through a network 14. Both the host 12 and the client 16 can be any suitable type of device, such as for example a personal computer, laptop computer, smart phone, soft phone, personal digital assistant or any other machine adapted for executing programmable instructions. The network 14 can include any suitable communication network or any combination thereof, including, but not limited to a TCP/IP network, CDMA, GSM, PSTN as well as variants thereof for coupling the host 12 and the client 16.

As shown, the example host 12 can include a series of modules adapted to perform predetermined tasks in response to predetermined inputs received from the client 16. In particular, the host 12 can include an authentication module 18 adapted to authenticate the client 16 to the host 12; an entity module 20 adapted to identify one or more entities to or on which the client 16 is attempting to operate; an argument module 22 adapted to identify a content or context of the operation to be performed to or on the entity; and an operations module 24 adapted to perform a predetermined operation selected by the client 16. The example client 16 can include a user interface 26 that is adapted to receive user input and thereby select from one or more predetermined options in communicating with one or more of the modules noted above.

In one example embodiment, the host 12 is a personal computer and the client 16 is a VoIP softphone operatively connected thereto over a VoIP network 14. In such an example, the user interface 26 can include a numeric or alphanumeric keypad on which the user communicates with the modules, i.e. authenticates him or herself and identifies an operation to be performed, the argument of that operation, and the entity upon or to which that operation is performed. Although not shown for clarity, the example system 10 shown in FIG. 1 can also include one or more servers operatively interfacing between the client 16 and the host 12, as well as one or more ancillary devices connected to the host 12, such as other computers to or on which the host 12 can operate at the behest of the client 16.

Figure 2:
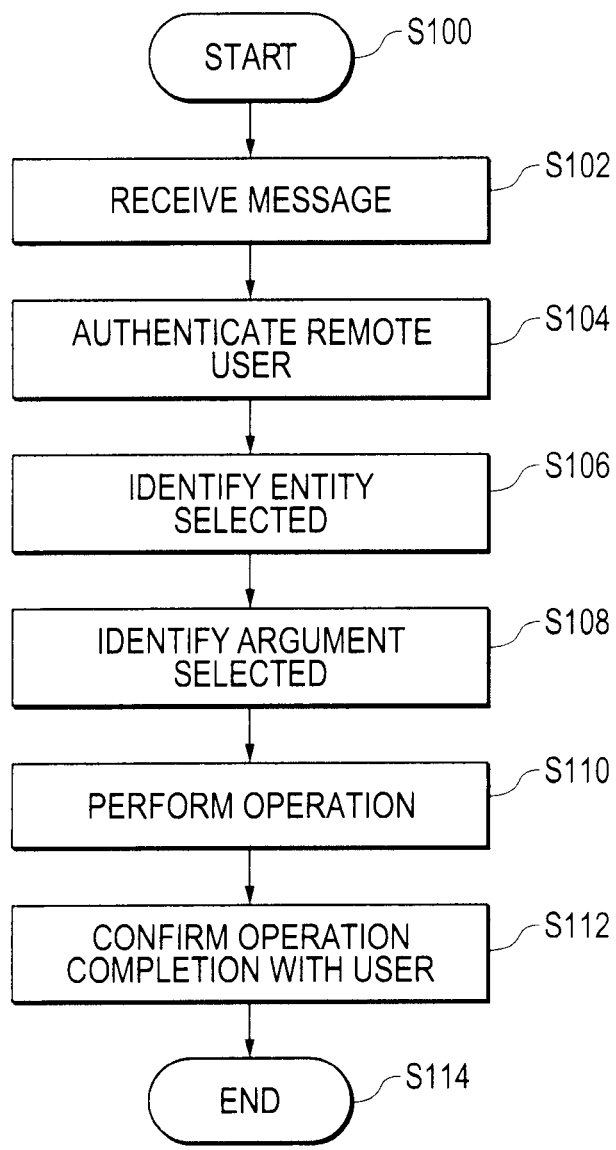
FIG. 2 is a flowchart depicting a method of a first embodiment in accordance with the present invention.

FIG. 2 is a flowchart depicting a method according to one embodiment of the present invention. Starting at block S100, the method of the embodiment proceeds to block S102 in which a message is received at the host terminal, wherein the message can include one or more fields including, but not limited to, an authentication field, an entity identity field, an argument identity field and an operation field. In block S104, the method of the embodiment recites authenticating a remote user to the host terminal. In block S106, the method of the embodiment recites identifying an entity selected. In one variation of the method of the embodiment, the entity is one of a terminal, a contact, a contact group or an application.

Block S108 of the method of the embodiment recites identifying an argument selected by the remote user. As noted above, the argument can include the content of a message, such as "Running Late" or "Meeting Canceled"; or the content of a task or set of instructions to be performed by the host terminal, such as "Restart" or "Begin Daily Build." Alternatively, the argument can include a batch file, script or executable file that is machine readable by the host terminal. In Block S110, the method of the embodiment recites performing the operation, wherein the operation is determined in part by the entity and the argument. As an example, the operation might include sending the message "Running Late" to an entity selected as a work group or contact group of the remote user. The message can take the form of a written message or a verbal, prerecorded message to be delivered by the host terminal. Alternatively, the operation might include causing a computer or terminal networked with the host terminal to perform a task, such as "Restart" or "Begin Daily Build." The operation might also include causing the host terminal itself to perform a task including at least those noted herein. As shown in block S112, the method of the embodiment can further include confirming completion of the operation with the remote user. The confirmation can take the form of a written confirmation or an oral confirmation in which the host terminal delivers a prerecorded message (in either written or spoken format) to the remote user's client device.

In one variation of the method of the embodiment, the entity is one of a contact or a contact group, and performing an operation selected by the remote user comprises transmitting a message to the entity. As noted above, the message can be either written or oral in nature as selected by the remote user. The message to be transmitted can be selected from a set of predetermined messages. Alternatively, the remote user can create the message to be transmitted contemporaneously or substantially contemporaneously with the communication of the argument field of the message to the host terminal.

In other variations of the method of the embodiment, the host terminal has a unique identifier that functions to identify it to at least the remote user through the network. The unique identifier can be configured in response to the type of network on which the method of the embodiment is performed. That is, the unique identifier can include for example a unique IP address or a unique phone number assigned to a voice over Internet protocol (VoIP) network. In another variation of the method of the embodiment, a user can configure the host terminal to receive messages of a predetermined format (i.e., VoIP) from the remote user (a VoIP enabled phone for example, which has its own unique VoIP phone number.) Embodiments of the configuration of the host terminal are described with reference to FIG. 4.

Figure 3:
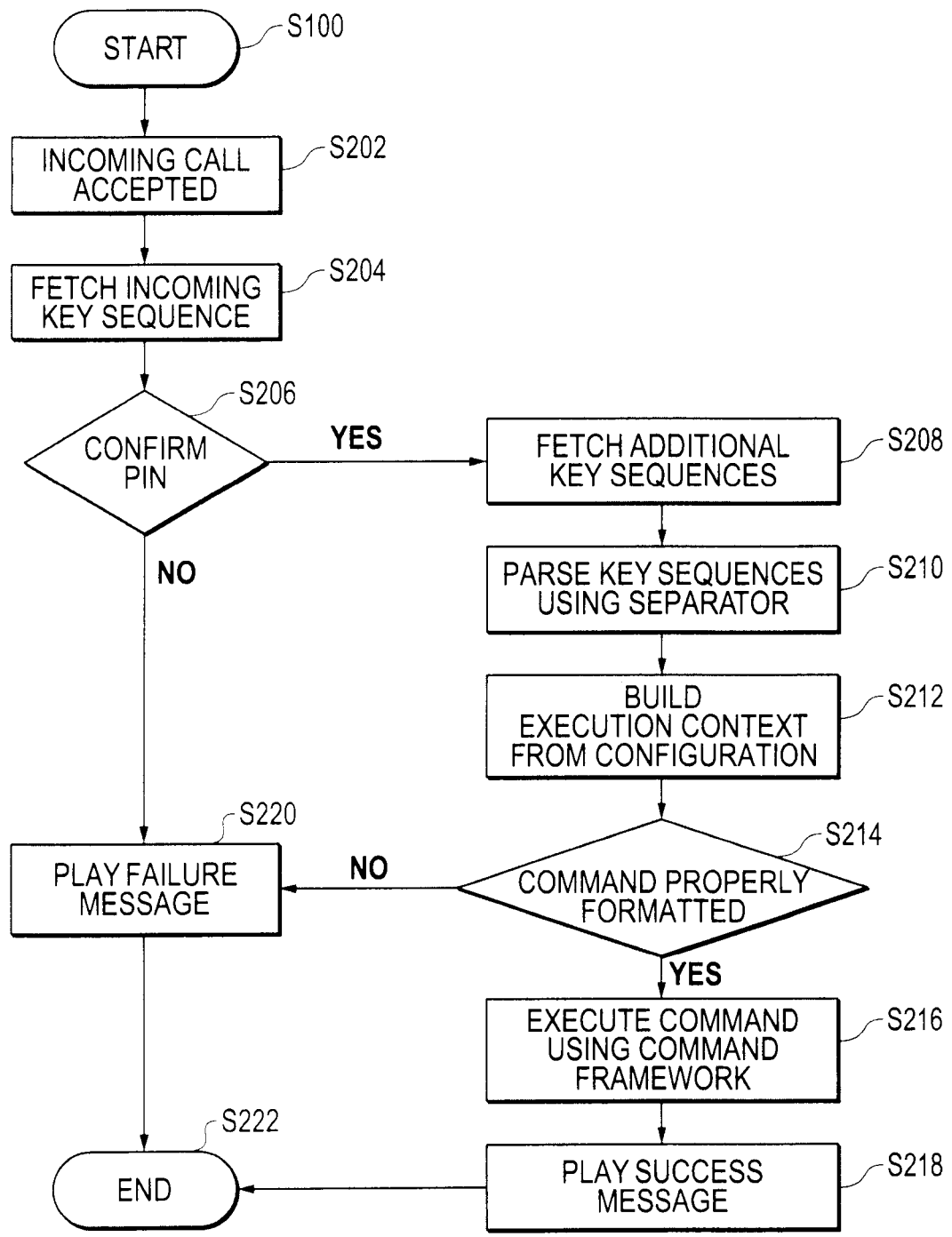
FIG. 3 is a flowchart depicting a variation of the method of the first embodiment in accordance with the present invention.

An example of the method of the embodiment is described with reference to FIG. 3. Starting in block S200, the variation of the example method proceeds to block S202 in which an incoming call from the remote terminal is accepted at the host terminal. The incoming call can include for example a VoIP call originating at the remote terminal, such as a VoIP phone or soft phone. In block S204, the host terminal can fetch an incoming key sequence input by the user at the remote terminal. The incoming key sequence can include for example a personal identification number (PIN) having a series of numeric or alphanumeric characters that are received by the host terminal for authenticating the identity of the remote user.

In decision block S206, the host terminal queries whether the PIN is authentic thereby confirming or denying the identity of the remote user. If the response is negative, then the example method proceeds to block S220, in which the host terminal responds to the remote user with a failure message indicating an invalid PIN. As noted above, the failure message can include for example one or both of a written and/or oral message conveyed to the remote terminal. If the response to decision block S206 is affirmative, then the example method proceeds to block S208, in which the host terminal fetches additional key sequences.

In one variation of the example method, the additional key sequences can include one or more series of numeric or alphanumeric characters spaced into separate fields, wherein each field can be indicative of an entity, an argument and/or an operation. In block S210, the host terminal parses the additional key sequences into respective fields using a separator, which can include for example an alphanumeric key entry such as "#" or "*" as entered by the remote user. Block S212 of the example method recites building an execution context from the configuration, wherein the configuration includes an identified entity, a requested argument and an operation to be performed by the host terminal.

The host terminal of the example method then queries whether the command received is properly formatted for execution in decision block S214. If the response is negative, then the example method proceeds to step S220 in which the failure message is returned to the remote user. If the answer is affirmative, then the example method proceeds to step S216, in which host terminal executes the command requested by the remote user using the command framework described herein. Step S218 of the example method recites playing a success message, which can include as noted above the transmission of a written and/or oral message to the remote user confirming the execution of the requested operation. The example method terminates in step S220 as shown in FIG. 3 upon transmission of either of a success message or a failure message by the host terminal.

Figure 4:
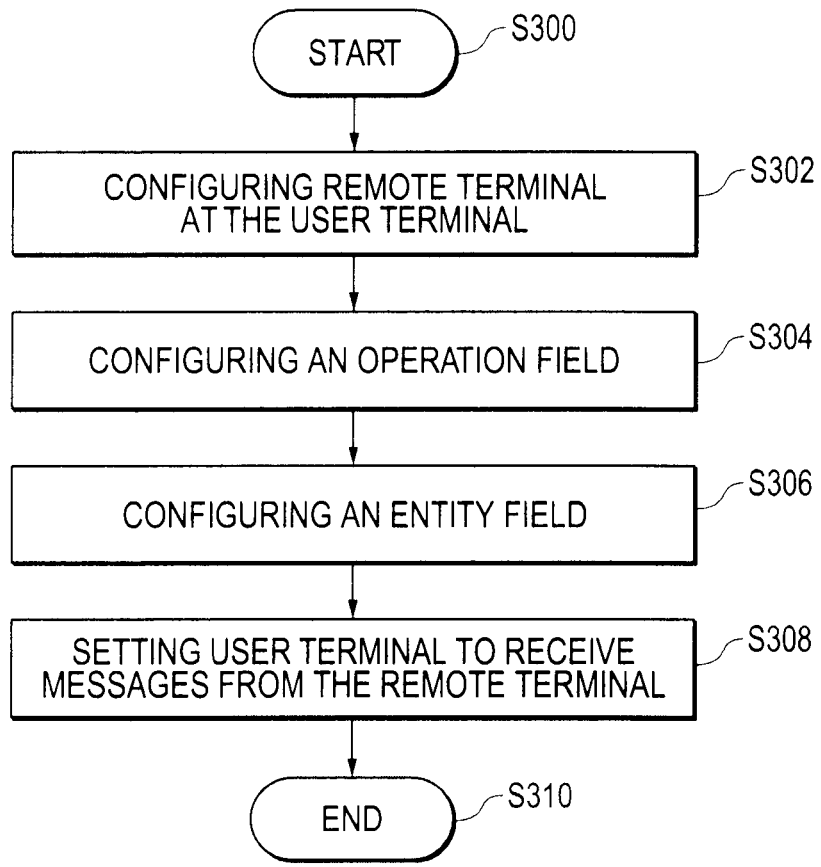
FIG. 4 is a flowchart depicting a method of a second embodiment in accordance with the present invention.

FIG. 4 depicts a method for configuring the host terminal in accordance with another embodiment of the present invention. Starting at block S300, the method of the second embodiment proceeds to block S302, which recites configuring a remote terminal at a user terminal, wherein the configuration including establishing an identifier field and a phone function. In block S304, the method of the second embodiment recites configuring an operation field having one or more predetermined operations. In one variation of the method of the second embodiment, the operation field can include one or more instructions to be performed by the host terminal. As noted herein, the instructions can include transmitting a message to a selected entity or causing the host terminal or a computer operatively coupled to the host terminal to perform a predetermined task.

Block S306 recites configuring an entity field having one or more predetermined entities. In one variation of the method of the second embodiment, the entity is one of a contact or a contact group, and an operation selected by the remote user can include transmitting a message to the entity. As noted above, the message can be either written or oral in nature as selected by the remote user. The message to be transmitted can be selected from a set of predetermined messages. Alternatively, the remote user can create the message to be transmitted contemporaneously or substantially contemporaneously with the communication of an argument field of the message to the host terminal.

In block S308, the method of the second embodiment recites setting the user terminal to receive messages from the remote terminal. As noted herein, the remote terminal can be a VoIP phone or a soft phone, and the host terminal can therefore be configured to receive phone calls from the remote terminal according to at least the VoIP transmission protocols. Referring to the description of FIG. 3 above, it should be understood that the messages can include one or more numeric or alphanumeric characters that are transmitted in a predetermined format to the host terminal for executing the allotted task. To that end, in one variation of the method of the second embodiment, the user can configure the remote terminal with a unique identifier such as a VoIP number and further configure the host terminal to receive calls, transmissions and/or messages from the remote terminal in response to the unique VoIP number.

In another variation of the method of the second embodiment, the method can include the step of configuring an argument field including one or more predetermined arguments performable by the user terminal. In one alternative, the argument field can include one or more predetermined messages to be transmitted to the entity. In another alternative, the argument field can include one or more predetermined instructions to be performed by the entity. As noted above, the argument can include the content of a message, such as "Running Late" or "Meeting Canceled"; or the content of a task or set of instructions to be performed by the host terminal, such as "Restart" or "Begin Daily Build." Alternatively, the argument can include a batch file, script or executable file that is machine readable by the host terminal.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular terms "a", "an" and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements and specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical applications, and to enable others of ordinary skill in the art to understand the invention for various embodiments with various modifications as are suited to the particular use contemplated.

What is claimed is:

1. A method comprising:
    receiving at a host terminal having a unique identifier, a Voice Over Internet protocol (VoIP) call originating at a remote terminal used by a remote user;
    establishing a direct VoIP communication between the host terminal and the remote terminal responsive to the received call;
    receiving, at the host terminal having a unique identifier, a Voice Over Internet protocol (VoIP) message as a part of the established VoIP communication;
    authenticating an identity of the remote user at the host terminal, wherein the authentication of the remote user permits the remote user to execute commands on the host terminal from the remote terminal using one or more VoIP messages conveyed over the direct VoIP communication;
    the host terminal receiving a command from the remote terminal for an operation to be performed by the host terminal, wherein the command is received within one of the one or more VoIP messages, wherein the one VoIP message comprising an authentication field, an operation field, an entity field and an argument field, wherein said command is defined in the operation field;
    identifying an entity selected by the remote user in response to the entity field;
    identifying an argument selected by the remote user in response to the argument field;
    authenticating the remote user using the authentication field; and
    performing the operation at the host terminal in response to receiving the command contained in the one VoIP message.

2. The method of claim 1, wherein a failure to authenticate the remote user results in the host terminal conveying a failure message to the remote user over the direct VoIP communication.

3. The method of claim 1, wherein the one VoIP message comprises an executable file, which is executed by the host terminal responsive to the command.

4. The method of claim 1, wherein the command is a written message typed into the remote terminal by the remote user.

5. The method of claim 1, wherein the host terminal is an interactive voice response system computer, wherein the VoIP communication is part of an interactive voice response system communication with the remote user.

6. The method of claim 1, further comprising configuring the host terminal to receive VoIP messages from the remote user, wherein the host terminal is part of an Interactive Voice Response system configurable by the remote user via the one VoIP message.

7. The method of claim 1, wherein receiving of the unique identifier was from a user terminal used by the remote user, said method further comprising:
    configuring the host terminal from the user terminal, the configuration including establishing an identifier field for the unique identifier and a phone function for the operation;
    configuring from the user terminal an operation field of the host terminal that comprising one or more predetermined operations comprising the operation;
    configuring from the user terminal the entity field of the host terminal that is for one or more predetermined entities; and
    setting the user terminal to receive messages from the host terminal.

8. The method of claim 7, wherein the operation field comprises one or more instructions to be performed by the user terminal.

9. A computer program product comprising:
    a non-transitory computer readable storage medium having computer readable program code embodied therewith, the computer readable program code comprising:
    computer readable program code to receiving at a host terminal having a unique identifier, a Voice Over Internet protocol (VoIP) call originating at a remote terminal used by a remote user;

computer readable program code to establish a direct VoIP communication between the host terminal and the remote terminal responsive to the received call;

computer readable program code to receiving at least one Voice Over Internet protocol (VoIP) message from the remote user as a part of the established VoIP communication, wherein the VoIP message comprising an authentication field, an operation field, an entity field and an argument field;

computer readable program code to authenticate the remote user in response to the authentication field;

computer readable program code to identify an entity selected by the remote user in response to the entity field;

computer readable program code to identify an argument selected by the remote user in response to the argument field; and computer readable program code to perform an operation selected by the remote user in response to the operation field, wherein the entity is one of a terminal, a contact, a contact group or an application on or to which the operation is to be performed.

10. The computer program product of claim 9, wherein the argument field comprises a batch file, a script, or an executable file that is machine readable by the host terminal.

11. The computer program product of claim 9 wherein the code to perform an operation selected by the remote user comprises code to transmit a message to the entity.

12. The computer program product of claim 11 wherein the code to perform an operation selected by the remote user comprises code to cause the entity to perform a predetermined task.

13. The computer program product of claim 9, wherein the argument field comprises one or more predetermined messages to be transmitted to the entity.

14. The computer program product of claim 9, wherein the unique identifier of the host terminal comprises a voice over Internet protocol number.

15. The computer program product of claim 9, further comprising computer readable program code to configure the host terminal to receive VoIP messages from the remote user.

16. A method comprising:
configuring a host terminal from a user terminal referred to herein as a remote terminal, the configuring including establishing an identifier field for a unique identifier and a phone function for an operation;

configuring from the remote terminal an operation field of the host terminal that comprising one or more predetermined operations comprising the operation;

configuring from the remote terminal an entity field of the host terminal that is for one or more predetermined entities;

setting the remote terminal to receive messages from the host terminal;

receiving at the host terminal, a Voice Over Internet protocol (VoIP) call originating at the remote terminal used by a remote user;

establishing a direct VoIP communication between the host terminal and the remote terminal responsive to the received call, wherein the VoIP communication utilizes the phone function for the operation;

receiving, at the host terminal, a Voice Over Internet protocol (VoIP) message as part of the established VoIP communication, wherein the VoIP message comprises a written command and a batch file, script or executable file that is machine readable by the host terminal;

authenticating an identity of the remote user at the host terminal utilizing the unique identifier, wherein authentication of the remote user permits the remote user to execute commands on the host terminal from the remote terminal, wherein a failure to authenticate the remote user results in the host terminal conveying a failure message to the remote user during the VoIP call;

the host terminal processing the command for the operation to be performed by the host terminal, wherein the operation causes the host terminal to execute the batch file, script, or executable file; and performing the operation at the host terminal in response to receiving the command contained in the VoIP message.

17. The method of claim 16, wherein the host terminal determining whether the command received is properly formatted for execution.

18. The method of claim 16, wherein the host terminal is an interactive voice response system computer, wherein the VoIP communication is part of an interactive voice response system communication with the remote user.

19. The method of claim 16 further comprising communicating a success message to the remote terminal responsive to confirming the execution of the operation, wherein the success message is a voice message.

\* \* \* \* \*